(12) United States Patent
Park et al.

(10) Patent No.: US 8,399,074 B2
(45) Date of Patent: Mar. 19, 2013

(54) COMPOSITIONS FOR LIQUID CRYSTAL DISPLAYS

(75) Inventors: So-Youn Park, Suwon-si (KR); Duck-Jong Suh, Seoul (KR); Won-Gap Yoon, Suwon-si (KR)

(73) Assignee: Samsung Display Co., Ltd. (KR)

( * ) Notice: Subject to any disclaimer, the term of this patent is extended or adjusted under 35 U.S.C. 154(b) by 621 days.

(21) Appl. No.: 12/504,540

(22) Filed: Jul. 16, 2009

(65) Prior Publication Data

US 2010/0080936 A1 Apr. 1, 2010

(30) Foreign Application Priority Data

Sep. 26, 2008 (KR) ........................ 10-2008-0094728

(51) Int. Cl.
*C09K 19/54* (2006.01)
*C09K 19/30* (2006.01)
*C09K 19/12* (2006.01)
*G02F 1/1339* (2006.01)

(52) U.S. Cl. ..................... 428/1.5; 428/1.52; 252/299.5; 252/299.63; 252/299.66

(58) Field of Classification Search .................. 428/1.1, 428/1.5, 1.52; 252/299.5, 299.61, 299.63, 252/299.66

See application file for complete search history.

(56) References Cited

U.S. PATENT DOCUMENTS

| | | | |
|---|---|---|---|
| 3,990,781 A | 11/1976 | Gum | |
| 2005/0181145 A1* | 8/2005 | Sakano et al. | 428/1.5 |
| 2006/0208219 A1* | 9/2006 | Imaizumi et al. | 252/299.01 |
| 2007/0020405 A1* | 1/2007 | Ochi et al. | 428/1.5 |

FOREIGN PATENT DOCUMENTS

| | | | |
|---|---|---|---|
| JP | 60162224 A | * | 8/1985 |
| JP | 2002088228 A | | 3/2002 |
| JP | 2004070297 A | | 3/2004 |
| JP | 2007079588 A | | 3/2007 |
| JP | 2007156183 A | | 6/2007 |
| JP | 2007334174 A | | 12/2007 |
| KR | 1020060017628 A | | 2/2006 |
| KR | 100591910 B | | 6/2006 |
| KR | 1020070044029 A | | 4/2007 |
| KR | 1020070054195 A | | 5/2007 |
| KR | 100808973 B | | 2/2008 |

* cited by examiner

*Primary Examiner* — Shean C Wu
(74) *Attorney, Agent, or Firm* — Innovation Counsel LLP

(57) ABSTRACT

In an exemplary embodiment of the present invention, the content ratio of polar and neutral compounds in a liquid crystal layer is controlled, or a coupling agent that is well adapted to those compounds is used as a material for a sealant, thereby stably maintaining the display quality of the liquid crystal display even at low temperatures.

16 Claims, 3 Drawing Sheets

COMPOSITIONS FOR LIQUID CRYSTAL DISPLAYS

CROSS-REFERENCE TO RELATED APPLICATION

This application claims priority to and the benefit of Korean Patent Application No. 10-2008-0094628 filed in the Korean Intellectual Property Office on Sep. 26, 2008, the entire content of which is incorporated herein by reference.

BACKGROUND (a) Technical Field

The present invention relates to a liquid crystal display.

(b) Discussion

Today, liquid crystal displays are widely used as flat panel displays. A liquid crystal display has two display panels on which field generating electrodes such as pixel electrodes and a common electrode are formed, and a liquid crystal layer that is interposed between the panels. In the liquid crystal display, voltages are applied to the field generating electrodes to generate an electric field over the liquid crystal layer, and the alignment of liquid crystal molecules of the liquid crystal layer is determined by the electric field. Accordingly, the polarization of incident light is controlled, thereby performing image display.

For a liquid crystal display to function properly, it is important to provide a liquid crystal that is capable of properly controlling the transmittance of light to obtain a desired image. Particularly, as the liquid crystal display is employed for use in various applications, it becomes increasingly desirable for a liquid crystal display to have characteristics such as low voltage driving, wide temperature operation range, high response speed, etc.

The above information disclosed in this Background section is only for enhancement of understanding of the background of the invention and therefore it may comprise information that does not form the prior art that is already known in this country to a person of ordinary skill in the art.

BRIEF SUMMARY

An exemplary embodiment of the present invention provides a liquid crystal display comprising: a first substrate, a second substrate facing the first substrate, a pair of field generating electrodes disposed on at least one of the first and second substrates, a sealant disposed on at least one of the first and second substrates, and a liquid crystal layer interposed between the first and second substrates, wherein the sealant comprises at least one of coupling agents represented by the following Formulas 10 and 11.

The liquid crystal layer may comprise at least one of neutral compounds represented by the following Formulas 6 to 8. The liquid crystal layer may comprise about 5-10 wt % of the neutral compound represented by the Formula 7. The liquid crystal layer may comprise polar compounds represented by the following Formulas 4 and 5. The liquid crystal layer may comprise a neutral compound represented by the following Formula 9. The liquid crystal layer may comprise about 10-14 wt % of the neutral compound represented by Formula 8. The liquid crystal layer may comprise a polar compound represented by the following Formula 1, and at least one of polar compounds represented by the following Formulas 2 and 3.

Another exemplary embodiment of the present invention provides a liquid crystal display comprising: a first substrate, a second substrate facing the first substrate, a pair of field generating electrodes disposed on at least one of the first and second substrates, a sealant disposed on at least one of the first and second substrates, and a liquid crystal layer interposed between the first and second substrates, wherein the liquid crystal layer comprises a neutral compound represented by the following Formula 6 and the content of the neutral compound represented by Formula 6 is about 28-32 wt % of the liquid crystal layer.

With a liquid crystal display according to an exemplary embodiment of the present invention, the compound contents of the liquid crystal layer are controlled so that the display quality can be stably maintained even at low temperatures.

Furthermore, with a liquid crystal display according to an exemplary embodiment of the present invention, a coupling agent that is well adapted to the compound contents of the liquid crystal layer is used as a material for the sealant so that the display quality can be stably maintained even at low temperatures.

DETAILED DESCRIPTION OF THE EMBODIMENTS

Figure 1:
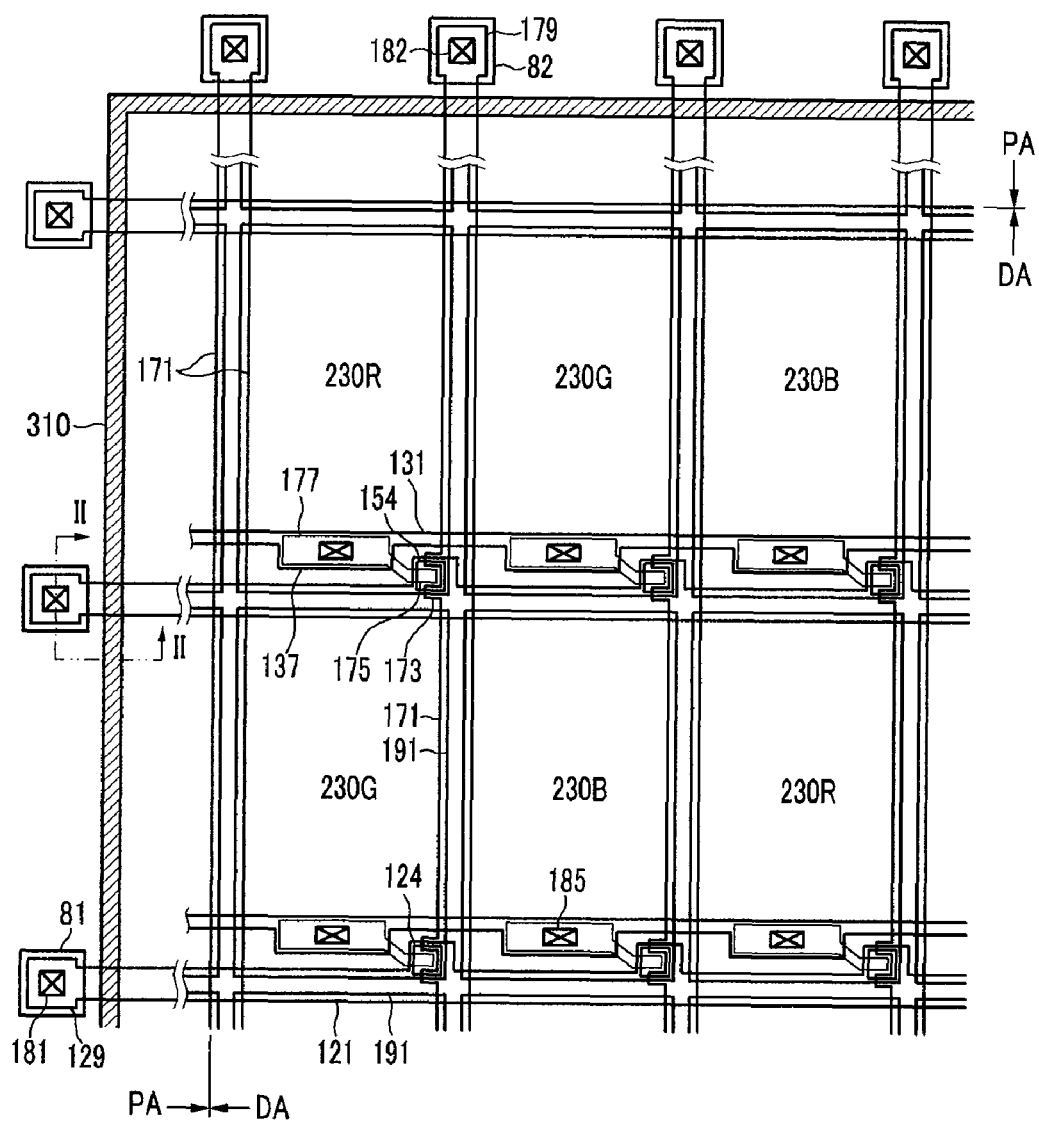
FIG. 1 is a layout view of a liquid crystal display according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. In the drawings, irrelevant portions are omitted to clearly describe the present invention, and like reference numerals designate like elements throughout the specification. Furthermore, detailed descriptions are not given to well-known arts.

In the drawings, the thickness of layers, films, panels, regions, etc., are exaggerated for clarity. It will be understood that when an element such as a layer, film, region, or substrate is referred to as being "on" another element, it can be directly on the other element or intervening elements may also be present. In contrast, when an element is referred to as being "directly on" another element, there are no intervening elements present. On the contrary, it will be understood that when an element such as a layer, film, region, or substrate is referred to as being "under" another element, it can be directly under the other element or intervening elements may also be present. In contrast, when an element is referred to as being "directly under" another element, there are no intervening elements present.

Then, a liquid crystal display according to an exemplary embodiment of the present invention will be described in detail with reference to FIG. 1 and FIG. 2.

Figure 2:
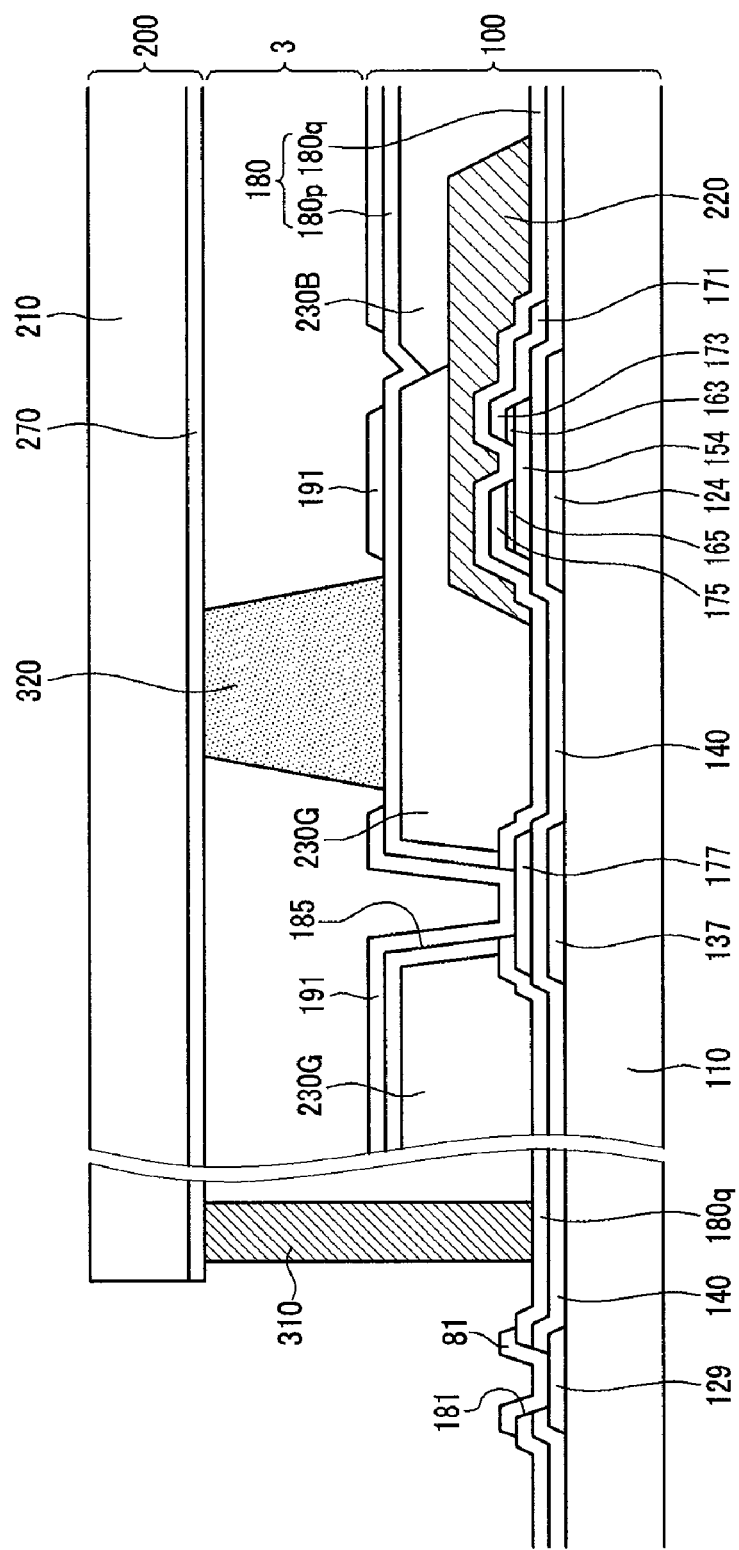
FIG. 2 is a cross-sectional view of the liquid crystal display taken along the II-II line of FIG. 1.

FIG. 1 is a layout view of a liquid crystal display according to an exemplary embodiment of the present invention, and FIG. 2 is a cross-sectional view of the liquid crystal display taken along the II-II line of FIG. 1.

Referring to FIG. 1 to FIG. 2, a liquid crystal display according to an exemplary embodiment of the present invention includes a first display panel 100, a second display panel 200, and a liquid crystal layer 3.

Alignment layers (not shown) may be formed on the inner surfaces of the first and second display panels 100 and 200. Horizontal alignment layers may be used as the alignment layers. Polarizers (not shown) may be provided on the outer surfaces of the first and second display panels 100 and 200.

The liquid crystal display has a display area DA that practically outputs images, and a peripheral area PA that surrounds the display area DA with various kinds of wires.

The first display panel 100 will now be described in detail.

Gate lines 121 and storage electrode lines 131 are formed on a first insulating substrate 110, which is formed with transparent glass or plastic.

The gate lines 121 carry gate signals, and extend substantially in the horizontal direction. The respective gate lines 121 have a plurality of gate electrodes 124 protruding upwards and have end portions 129.

The storage electrode lines 131 receive a predetermined voltage and extend substantially parallel to the gate lines 121. Each storage electrode line 131 is placed close to a gate line 121. Each storage electrode line 131 has a primary storage electrode 137 with a substantially square shape, and a secondary storage electrode (not shown). The shape and disposition of the storage electrode lines 131 may be altered.

A gate insulating layer 140 is formed on the gate lines 121 and the storage electrode lines 131 with silicon nitride (SiNx) or silicon oxide (SiOx).

Semiconductor islands 154 are formed on the gate insulating layer 140 with hydrogenated amorphous silicon (a-Si) or polysilicon. Each semiconductor island 154 is formed on a gate electrode 124.

Island-like ohmic contacts 163 and 165 are formed on the semiconductor islands 154. The ohmic contacts 163 and 165 may be formed with n+ hydrogenated amorphous silicon (where n-type impurities such as phosphorus are doped at a high concentration) or of silicide.

Data lines 171 and drain electrodes 175 are formed on the ohmic contacts 163 and 165 and the gate insulating layer 140.

The data lines 171 carry data voltages, and extend substantially in the vertical direction such that they cross the gate lines 121. The data lines 171 extend parallel to the secondary storage electrodes (not shown) while being positioned close to the gate electrodes 124. The data lines 171 have a source electrode 173 bent around the gate electrode 124 in the shape of a U. The source electrode 173 may have any suitable shape other than a U. Also, the data lines 171 have end portions 179.

Each drain electrode 175 is separated from the data line 171, and has a narrow portion and a wide portion 177. While the narrow portion of the drain electrode 175 has an end that is partially surrounded by the source electrode 173, its wide portion 177 is substantially square-shaped and overlaps the primary storage electrode 137. The wide portion 177 of the drain electrode 175 is generally smaller in area than the primary storage electrode 137.

A gate electrode 124, a source electrode 173, and a drain electrode 175 format a thin film transistor (TFT) in association with a semiconductor 154, and the channel of the thin film transistor is formed at the semiconductor 154 between the source and drain electrodes 173 and 175.

The ohmic contacts 163 and 165 exist only between the underlying semiconductors 154 and the overlying data lines 171 and drain electrodes 175 so as to lower the contact resistance therebetween. Each semiconductor 154 has exposed portions, which are not covered by the data lines 171 and the drain electrodes 175, including a portion thereof between the source and drain electrodes 173 and 175.

A passivation layer 180 is formed on the data lines 171, the drain electrodes 175, and the exposed portions of the semiconductor 154. The passivation layer 180 has upper and lower layer parts 180p and 180q based on an inorganic insulator such as silicon nitride or silicon oxide. The upper passivation layer 180p may be formed with an organic insulator, and in this case, it may be greater in thickness than the lower passivation layer 180q. Either of the upper and lower passivation layers 180p and 180q may be omitted. Contact holes 185 are formed at the passivation layer 180 so as to open the wide portions 177 of the drain electrodes 175.

A light blocking member 220, called a black matrix, is formed on the lower passivation layer 180q. The light blocking member 220 prevents light from passing a region where the liquid crystal molecules of the liquid crystal layer 3 cannot be controlled, or external light from being reflected. Alternatively, the light blocking member 220 may be formed at the second display panel 200 rather than at the first display panel 100.

Red, green, and blue color filters 230R, 230G, and 230B are formed between the upper and lower passivation layers 180p and 180q. The red color filter 230R occupies a region between neighboring data lines 171. The left and right boundaries of the red color filter 230R may be located on the neighboring data line 171 while being longitudinally extended along the data lines 171, and in this case, the red color filter 230R may be formed in the shape of a stripe. A contact hole 185 is formed at the red color filter 230R over the wide portion 177 of the drain electrode 175. The red color filter 230R may be formed with a photosensitive organic material comprising a red pigment. Alternatively, the red color filter 230R may be formed at the second display panel 200 rather than at the first display panel 100, and in this case, the upper passivation layer 180p may be omitted. The description regarding the red color filter 230R may be likewise applied to the green and blue color filters 230G and 230B.

Pixel electrodes 191 and contact assistants 81 and 82 are formed on the upper passivation layer 180p. The pixel electrodes 191 and contact assistants 81 and 82 may be formed with a transparent conductive material such as ITO and IZO. When the color filters 230R, 230G, and 230B are formed at the second display panel 200, the pixel electrodes 191 and contact assistants 81 and 82 may be formed with a transparent conductive material, or a reflective metal such as aluminum, silver, chromium, and alloys thereof.

Contact assistants 81 and 82 are connected with end portions 129 and 179 through the contact holes 181 and 182, respectively.

Each pixel electrode 191 is connected to a drain electrode 175 of the thin film transistor through the contact hole 185, and receives a data voltage from the drain electrode 175. Upon receipt of the data voltage, the pixel electrode 191 generates an electric field in association with a common electrode 270 of the second display panel 200 so that the alignment direction of the liquid crystal molecules of the liquid crystal layer 3 between the pixel electrode 191 and the common electrode 270 are determined. The luminance of the light passing through the liquid crystal layer 3 is differentiated depending upon the determined direction of the liquid crystal molecules.

A pixel electrode 191 and the common electrode 270 form a liquid crystal capacitor to store an applied voltage even after the thin film transistor turns off.

The pixel electrode 191 and the drain electrode 175 connected to the pixel electrode 191 overlap the storage electrode line 131 with the primary storage electrode 137 and the secondary storage electrode (not shown), thereby forming a storage capacitor.

Spacers 320 based on an organic material are formed at the display area DA of the liquid crystal display. The spacers 320 maintain the space of the liquid crystal layer 3.

The second display panel 200 will now be described in detail.

A common electrode 270 is formed on a second insulating substrate 210, which is formed of transparent glass or plastic. The common electrode 270 is formed of a transparent conductor such as ITO and IZO, and receives a common voltage.

An alignment layer (not shown) may be formed on the common electrode 270.

A sealant 310 is formed at the peripheral area PA of the liquid crystal display between the first and second display panels 100 and 200 to seal the liquid crystal therein. The sealant 310 may be provided with a liquid crystal injection hole (not shown), and is deposited on either of the first and second display panels 100 and 200.

The liquid crystal layer 3 will now be described in detail.

The liquid crystal layer 3 may have positive dielectric anisotropy such that directors of the liquid crystal molecules thereof are aligned substantially parallel to the surfaces of the two display panels 100 and 200 with no electric field.

The dielectric anisotropy $\in_1$ is a difference between horizontal dielectric anisotropy $\in_{\|1}$ directed parallel to the directors of the liquid crystal compound and vertical dielectric anisotropy $\in_{\perp 1}$ directed perpendicular to the directors thereof. When the horizontal dielectric anisotropy $\in_{\|1}$ is relatively high, the dielectric anisotropy has a positive value, whereas when the vertical dielectric anisotropy $\in_{\perp 1}$ is relatively high, the dielectric anisotropy has a negative value.

A liquid crystal composition according to an exemplary embodiment of the present invention will now be described in detail.

The liquid crystal composition of the invention includes various kinds of liquid crystal compounds with different physical characteristics (referred to hereinafter as "liquid crystal").

The liquid crystal includes a core group, and a terminal or lateral group connected to the core group.

The core group of the liquid crystal may include one or more of a phenyl group, a cyclohexyl group, and a cyclic compound selected from heterocycles.

The terminal or lateral group may include one or more of a non-polar group such as an alkyl group, an alkoxy group, and an alkenyl group, or a polar group comprising fluorine atoms. The liquid crystal is altered in physical characteristics depending upon the functionality in the terminal or lateral group.

The liquid crystal composition according to an exemplary embodiment of the present invention may be employed for use in a liquid crystal display, and in this case, it may be aligned parallel to the electric field formation direction.

The liquid crystal composition according to an exemplary embodiment of the present invention includes a polar compound having positive dielectric anisotropy, and a neutral compound not having dielectric anisotropy.

For example, the polar compound having positive dielectric anisotropy may be liquid crystal groups represented by Formulas 1 to 3, respectively, and may comprise one or more of Formulas 1, 2, and 3.

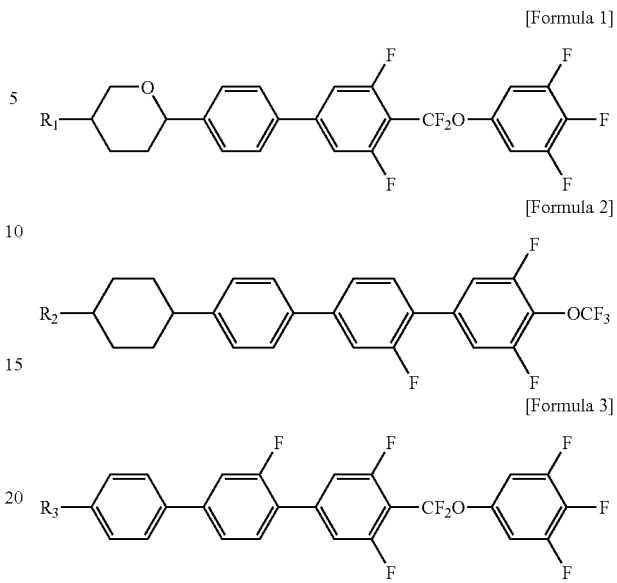

In Formulas 1 to 3, $R_1$ to $R_3$ may be the same or different from each other, and each may be an alkyl or alkoxy group with a carbon number of 1 to 13.

Furthermore, the polar compound having positive dielectric anisotropy may be liquid crystal groups represented by Formulas 4 and 5, and may comprise one or more of Formulas 4 and 5.

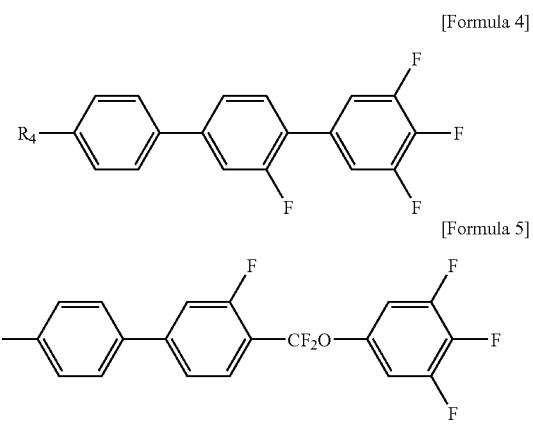

In Formulas 4 and 5, $R_4$ and $R_5$ may be the same or different from each other, and each may be an alkyl or alkoxy group with a carbon number of 1 to 13.

The neutral compound may include one or more compounds selected from the compounds represented by Formulas 6 to 8.

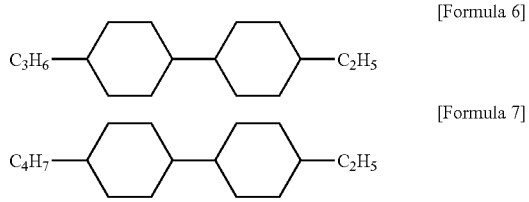

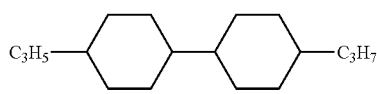

[Formula 8]

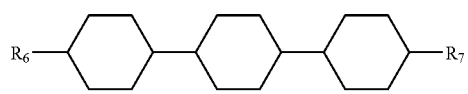

[Formula 9]

The liquid crystal may comprise about 28 to 32 wt % of the compound represented by Formula 6. When the content of that compound is less than about 28 wt %, the rotational viscosity of the liquid crystal exceeds about 90 mPa·s so that it becomes difficult to achieve the characteristic of high response speed of about 16 ms or more. By contrast, when the content of the compound exceeds about 32 wt %, the dielectric anisotropy ∈ is less than the value of about 12 so that the contrast ratio of the liquid crystal panel becomes deteriorated.

The liquid crystal may comprise about 5 to 10 wt % of the compound represented by Formula 7. When the content of the compound is less than about 5 wt %, the rotational viscosity of the liquid crystal is heightened so that it becomes difficult to achieve the characteristic of high response speed. By contrast, when the content of the compound exceeds about 10 wt %, the low temperature phase transition peak is revealed at about −4 to −5° C., and hence stains are left at low temperatures.

Stains Mean Display Failure, Such as an Afterimage and Unevenness.

The liquid crystal comprises about 10 to 14 wt % of the compound represented by Formula 8. When the content is less than about 10 wt %, the rotational viscosity of the liquid crystal is heightened so that it becomes difficult to achieve the characteristic of high response speed. By contrast, when the content exceeds about 14 wt %, the low temperature phase transition peak is revealed at about −4 to −5° C., and hence stains are left at low temperatures.

The neutral compound may further include the compound represented by Formula 9.

In Formula 9, $R_6$ and $R_7$ may be the same or different from each other, and each may be an alkyl or alkoxy group with a carbon number of 1 to 13.

Liquid crystal displays were fabricated using liquid crystal compositions where the compounds represented by Formulas 1 to 9 were mixed in the ratio of weight percents (wt %) listed in Table 1. Furthermore, with the formation of the sealant 310 of the liquid crystal display, about 1 wt % of a compound represented by Formula 10 was added to the sealant composition as a coupling agent.

[Formula 10]

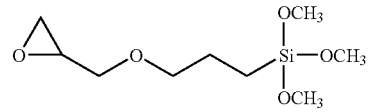

The low temperature phase transition temperature of the liquid crystal compositions of Table 1 was measured using a differential scanning calorimeter (DSC). The phase transition not being observed at low temperatures means that the liquid crystal was stably maintained even at the low temperatures, and accordingly, the display quality of the liquid crystal display was not deteriorated. The period up to the time when stains occur at the liquid crystal displays based on the liquid crystal compositions of Table 1 was measured through a low temperature storage test at low temperatures of −25° C. and −30° C. The dielectric anisotropy and the viscosity of the liquid crystal compositions of Table 1 were measured using a dielectrometer and a viscometer.

TABLE 1

|  |  | Comp. Ex. 1 | Comp. Ex. 2 | Ex. 1 | Ex. 2 | Ex. 3 | Ex. 4 |
|---|---|---|---|---|---|---|---|
| Liquid | Formula 1 | 13 | 13 | 13 | 7 | 7 | 7 |
| crystal | Formula 2 | — | — | — | 5 | 5 | 5 |
| composition | Formula 3 | — | — | — | 4 | 4 | 4 |
| (wt %) | Formula 4 | 8.5 | 8.5 | 8.5 | 7 | 5 | 3.5 |
|  | Formula 5 | 15 | 15 | 15 | 14 | 16 | 18 |
|  | Formula 6 | — | 15 | 29 | 30 | 32 | 29 |
|  | Formula 7 | 14 | 14 | — | 10 | 5 | 7.5 |
|  | Formula 8 | 15 | — | — | — | — | — |
|  | Formula 9 | 15 | 15 | 15 | 2 | 4 | 4 |
| Low temperature phase transition temperature (° C.) | | −30 | −4.5 | — | — | — | — |
| Low temperature storage test (hour) | −25° C. | 432 | 120 | 192 | 500~ | 500~ | 500~ |
|  | −30° C. | 72 | 120 | 192 | 500~ | 500~ | 500~ |
| Dielectric anisotropy | | 11.7 | 11.8 | 11.2 | 12.4 | 12.7 | 13.1 |
| Viscosity (mPa · s) | | 85 | 82 | 80 | 80 | 82 | 84 |
| Phase transition temperature (Tni, ° C.) | | 75 | 76 | 70 | 74.5 | 75 | 74.5 |

In Table 1, "Comparative Example" has a conventional liquid crystal and sealant composition and "Examples" have liquid crystal compositions. The Example use the sealant composition as a coupling agent [formula 10], and the Comparative example have not the [formula 10].

As known from the Table 1, the low temperature phase transition of the liquid crystal composition is closely related to the contents of the neutral compounds represented by Formulas 6 to 8.

When the content of the neutral compound represented by Formula 6 was 29 wt % or more, the low temperature phase transition temperature did not exist, and the low temperature storage test showed that stains did not occur for a long time.

Furthermore, when the content of the neutral compound represented by Formula 7 was added to the liquid crystal composition, the stain occurrence did not occur for a longer time.

Figure 3:
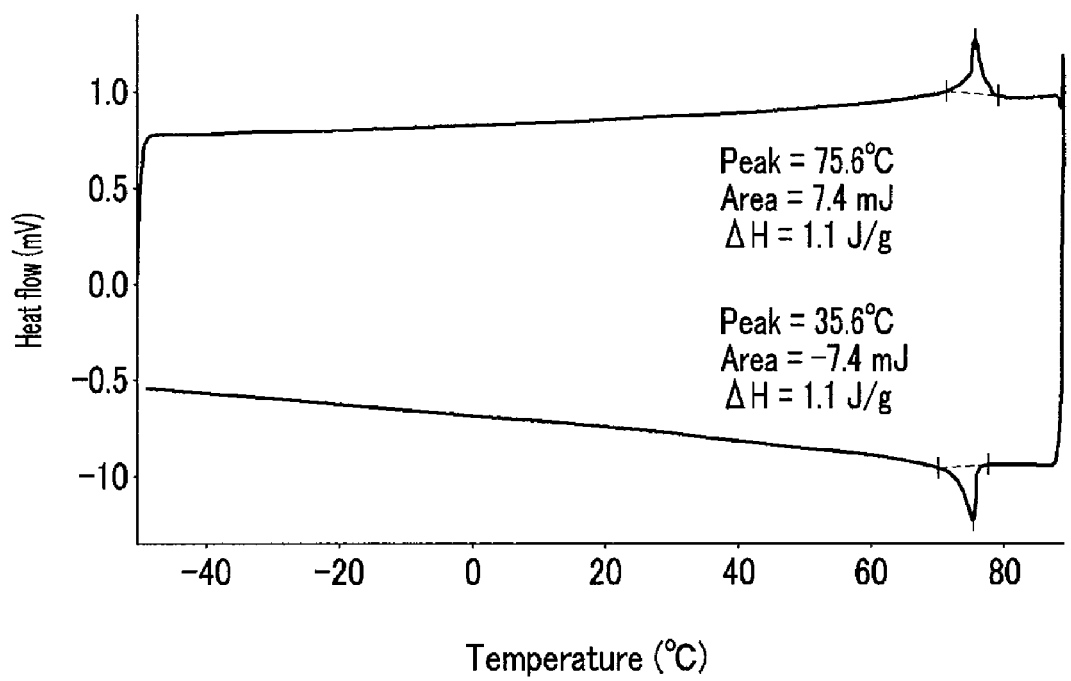
FIG. 3 is a graph illustrating low temperature phase transition temperatures according to an exemplary embodiment of the present invention.

FIG. 3 is a graph illustrating the low temperature phase transition temperatures of the liquid crystal compositions according to the Examples 3 and 4. It may be known from the graph that phase transitions did not occur at low temperatures.

Furthermore, the dielectric anisotropy and the phase transition temperature of the liquid crystal composition may be controlled through further adding the compounds represented by Formulas 2 and 3 thereto.

Liquid crystal compositions according to Examples 5 and 6 were the same as those according to Comparative Examples 1 and 2, respectively, except that a compound represented by Formula 11 was used as a coupling agent in the sealant. In the examples, the low temperature storage test at −25° C. and −30° C. showed that storage stability for about 300 hours or more was achieved.

Liquid crystal compositions according to Examples 7 to 10 were the same as those according to Comparative Examples 1 to 4, respectively, except that the compound represented by Formula 11 was used as a coupling agent in the sealant. In the examples, the low temperature phase transition temperature did not exist, and the low temperature storage test at −25° C. and −30° C. showed that high storage stability for about 500 hours or more was achieved.

Furthermore, with the liquid crystal compositions according to Examples 5 to 10, adherence was maintained to be constant for twenty four (24) hours or more under moisture pressurizing conditions of 121° C., 2 atm, and 100% RH. Furthermore, the viscosity elevation degree at room temperature of 25° C. for forty eight (48) hours was lowered to 1.26. Accordingly, when the compound represented by Formula 11 was used as a coupling agent in the sealant, the stability of the liquid crystal was maintained to be constant at low temperatures irrespective of the content ratio of the liquid crystal composition.

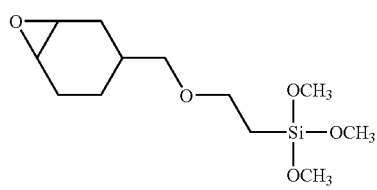

[Formula 11]

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display comprising:
   a first substrate;
   a second substrate facing the first substrate;
   a pair of field generating electrodes disposed on at least one of the first and second substrates;
   a sealant disposed on at least one of the first and second substrates; and
   a liquid crystal layer interposed between the first and second substrates,
   wherein the sealant comprises a coupling agent represented by the following Formula 11:

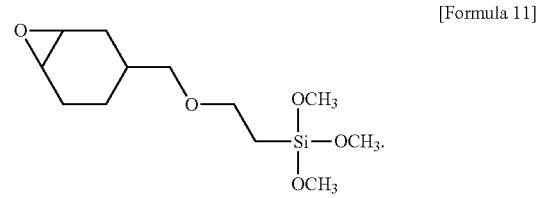 [SMILES: CO[Si](CCOCC1CCC2OC2C1)(OC)OC]

[Formula 11]

2. The liquid crystal display of claim 1, wherein the liquid crystal layer comprises at least one of neutral compounds represented by the following Formulas 6 to 8:

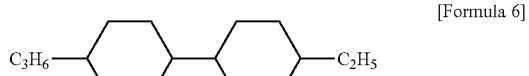

[Formula 6]

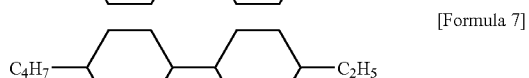

[Formula 7]

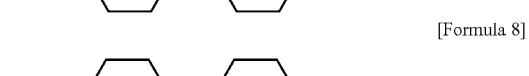

[Formula 8]

3. The liquid crystal display of claim 2, wherein the liquid crystal layer comprises about 28-32 wt % of the neutral compound represented by Formula 6.

4. The liquid crystal display of claim 3, wherein the liquid crystal layer comprises about 5-10 wt % of the neutral compound represented by Formula 7.

5. The liquid crystal display of claim 4, wherein the liquid crystal layer comprises polar compounds represented by the following Formulas 4 and 5:

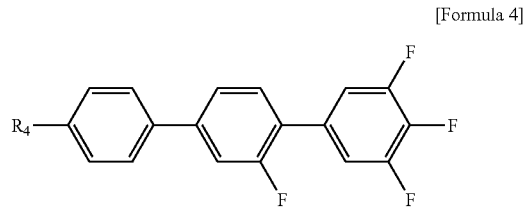

[Formula 4]

-continued

[Formula 5]

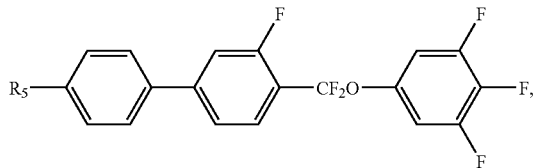

and in Formulas 4 and 5, each of $R_4$ and $R_5$, being the same or different from each other, are one of an alkyl group and an alkoxy group with a carbon number of 1 to 13.

6. The liquid crystal display of claim 5, wherein the liquid crystal layer comprises a neutral compound represented by the following Formula 9:

[Formula 9]

and in Formula 9, each of $R_6$ and $R_7$, being the same or different from each other, are one of an alkyl group and an alkoxy group with a carbon number of 1 to 13.

7. The liquid crystal display of claim 2, wherein the liquid crystal layer comprises about 10-14 wt % of the neutral compound represented by Formula 8.

8. The liquid crystal display of claim 2, wherein the liquid crystal layer comprises a polar compound represented by the following Formula 1, and at least one of polar compounds represented by the following Formulas 2 and 3:

[Formula 1]

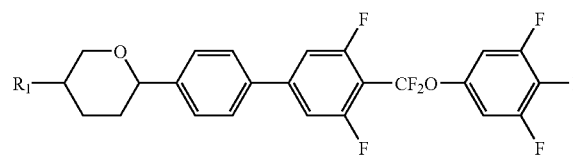

[Formula 2]

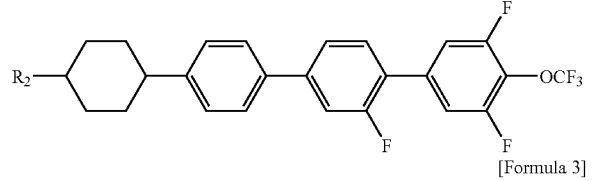

[Formula 3]

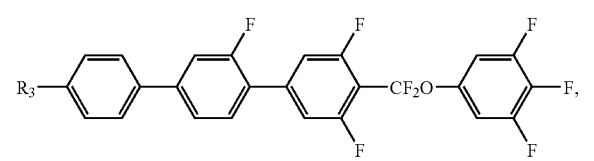

and in Formulas 1 to 3, each of $R_1$ to $R_3$, being the same or different from each other, are one of an alkyl group and an alkoxy group with a carbon number of 1 to 13.

9. A liquid crystal display comprising:
a first substrate;
a second substrate facing the first substrate;
a pair of field generating electrodes disposed on at least one of the first and second substrates;
a sealant disposed on at least one of the first and second substrates; and
a liquid crystal layer interposed between the first and second substrates, wherein the liquid crystal layer comprises a neutral compound represented by the following Formula 6:

[Formula 6]

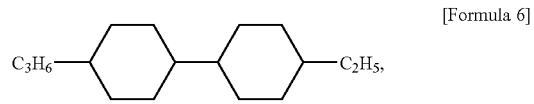

and the content of the neutral compound represented by Formula 6 is about 28-32 wt % of the liquid crystal layer.

10. The liquid crystal display of claim 9, wherein the liquid crystal layer comprises further about 5-10 wt % of a neutral compound represented by the following Formula 7:

[Formula 7]

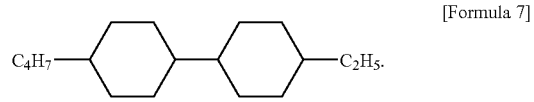

11. The liquid crystal display of claim 10, wherein the liquid crystal layer comprises further polar compounds represented by the following Formulas 4 and 5:

[Formula 4]

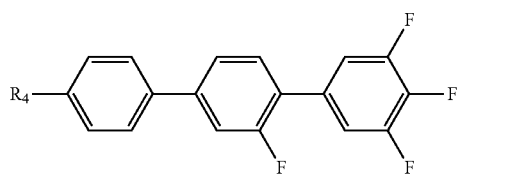

[Formula 5]

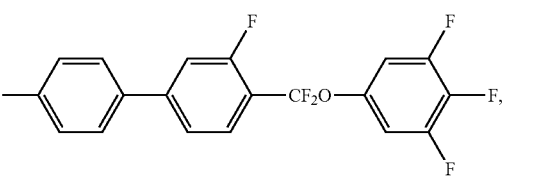

and in Formulas 4 and 5, each of $R_4$ and $R_5$, being the same or different from each other, are one of an alkyl group and an alkoxy group with a carbon number of 1 to 13.

12. The liquid crystal display of claim 11, wherein the liquid crystal layer comprises further a neutral compound represented by the following Formula 9:

[Formula 9]

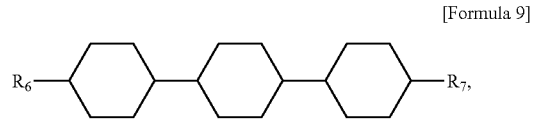

and in Formula 9, each of $R_6$ and $R_7$, being the same or different from each other, are one of an alkyl group and an alkoxy group with a carbon number of 1 to 13.

13. The liquid crystal display of claim 9, wherein the liquid crystal layer comprises further about 10-14 wt % of a neutral compound represented by the following Formula 8:

[Formula 8]

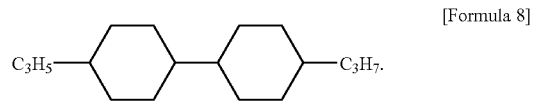

14. The liquid crystal display of claim 9, wherein the liquid crystal layer comprises further polar compounds represented by Formulas 4 and 5:

[Formula 4]

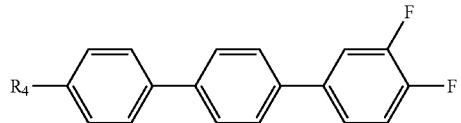

[Formula 5]

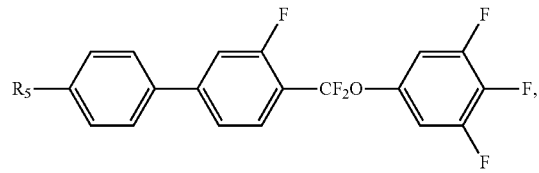

and in Formulas 4 and 5, each of $R_4$ and $R_5$, being the same or different from each other, are one of an alkyl group and an alkoxy group with a carbon number of 1 to 13.

15. The liquid crystal display of claim 9, wherein the liquid crystal layer comprises further a compound represented by Formula 9:

[Formula 9]

and in Formula 9, each of $R_6$ and $R_7$, being the same or different from each other, are one of an alkyl group and an alkoxy group with a carbon number of 1 to 13.

16. The liquid crystal display of claim 9, wherein the liquid crystal layer comprises further a polar compound represented by the following Formula 1, and at least one of polar compounds represented by the following Formulas 2 and 3:

[Formula 1]

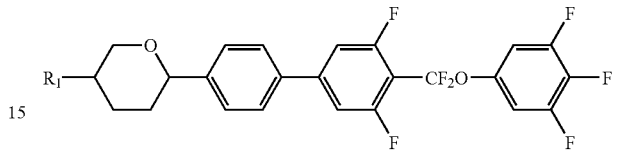

[Formula 2]

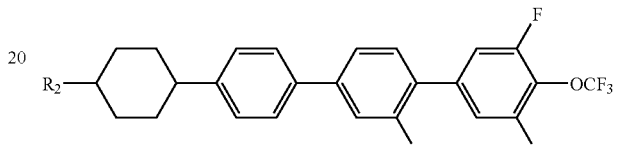

[Formula 3]

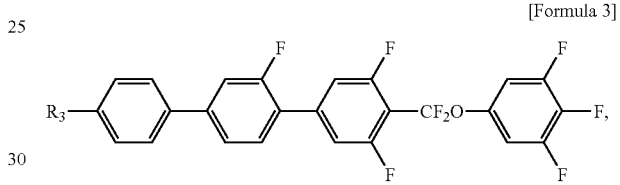

and in Formulas 1 to 3, each of $R_1$ to $R_3$, being the same or different from each other, are one of an alkyl group and an alkoxy group with a carbon number of 1 to 13.

* * * * *